United States Patent [19]

Miller et al.

[11] 3,812,717

[45] May 28, 1974

[54] SEMICONDUCTOR DIODE THERMOMETRY

[75] Inventors: Gabriel Lorimer Miller, Westfield; David Arthur Hall Robinson, Murray Hill, both of N.J.

[73] Assignee: Bell Telephone Laboratories Incorporated, Murray Hill, N.J.

[22] Filed: Apr. 3, 1972

[21] Appl. No.: 240,705

[52] U.S. Cl. .......... 73/362 SC, 307/310, 317/235 Q, 317/235 AD

[51] Int. Cl. .......... G01k 7/24, H01l 9/10

[58] Field of Search .......... 73/362 SC; 307/310; 317/235 AD, 235 Q

[56] References Cited

UNITED STATES PATENTS

| | | | |
|---|---|---|---|
| 3,309,553 | 3/1967 | Kromer | 317/235 AD UX |
| 3,385,981 | 5/1968 | Mayer et al. | 317/235 AD UX |
| 3,430,077 | 2/1969 | Bargen | 73/362 SC X |
| 3,465,176 | 9/1969 | Masaru Tanaka et al. | 317/235 AD UX |

OTHER PUBLICATIONS

"G.E. Transistor Manual," Seventh Edition, p. 439, General Electric Co., Syracuse, N.Y., 1964.

Gallium Arsenide Diode used as Low Temperature Thermometer, In Instrument Practice Vol. 17, No. 1, p. 37.

*Primary Examiner*—Richard C. Queisser
*Assistant Examiner*—Frederick Shoon
*Attorney, Agent, or Firm*—G. S. Indig; A. N. Friedman

[57] ABSTRACT

A temperature measuring apparatus is disclosed, in which the temperature sensing element is a semiconductor diode. The diode used is constructed such that carrier recombination takes place principally within the depletion region of the p-n junction. The temperature reading is made by measurement of the forward voltage drop across the diode as the diode current is switched between two current levels of a fixed ratio. The difference between the voltages measured at the two current levels is linearly proportional to the absolute temperature. The temperature scale thus defined is essentially constant from diode to diode from cryogenic temperatures to somewhat above room temperature.

8 Claims, 4 Drawing Figures

SEMICONDUCTOR DIODE THERMOMETRY

BACKGROUND OF THE INVENTION

1. Field of the Invention

This disclosure pertains to thermometry from cryogenic temperatures to above room temperature.

2. Description of the Prior Art

It is well known that the temperature dependence of the current-voltage characteristic of a forward biased p-n junction in a diode or transistor can be used for thermometry. Such thermometers are able to cover quite a wide temperature range (e.g. ~1°K. to ~400°K. with suitable diodes) but exhibit nonlinear response and, for a high degree of precision, have to be individually calibrated (A. G. McNamara, *Review of Scientific Instruments*, 33, [1962] 330). A good deal of scientific effort has gone into the development of linear thermometers which can measure temperature reproducibly from unit to unit to a good degree of accuracy without individual calibration. These efforts have been met with some limited success.

A current switching scheme has been developed which, applied to diodes, goes a long way toward linearizing the temperature scale derived from a forward biased junction. This scheme involves switching the forward current between two preselected values and measuring the difference between the junction voltages observed during the flow of these two currents. However, applied to commonly used diode thermometers this technique still leaves a degree of nonlinearity which would be desirably eliminated. Improved linearity and reproducibility has been achieved (V. W. Bargen, *Proceedings of the International Solid State Circuits Conference*, , [1967] page 90) through the application of this scheme to a previously developed transistor thermometer (W. L. Patterson, *Review of Scientific Instruments*, 34, [1962] 1311). However, the thermometric system thus produced is limited, at the low temperature end of its useful range, to temperatures at which the transistor gain is sufficiently high to enable the Patterson thermometer to operate. Diode thermometers are capable of operating to much lower temperatures.

SUMMARY OF THE INVENTION

A class of semiconductor diodes has been found which can be used as the temperature sensitive element in a thermometric apparatus possessing an essentially linear temperature scale extending from cryogenic temperatures to above room temperature when used in a current switching type of thermometric system. The characteristics of these diodes are such that this linear temperature scale is essentially constant from diode to diode. The condition defining the utilized diode class is the requirement that carriers injected into the diode depletion region recombine within that region.

This depletion layer recombination behavior can be achieved to a high degree, for instance, in indirect bandgap semiconductor materials, by the inclusion of depletion-layer-broadening "intrinsic" region possessing a sufficiently high density of recombination centers, situated between the *p* and *n* regions of the diode. Among indirect bandgap semiconductors silicon is a preferred material for this use. In direct bandgap semiconductor materials, doping levels and recombination center densities can be adjusted so as to achieve depletion layer recombination without the inclusion of an intrinsic layer. Preferred materials of this class are gallium arsenide and some of its closely related alloys.

DETAILED DESCRIPTION OF THE INVENTION

Diode Temperature Response

Figure 1:
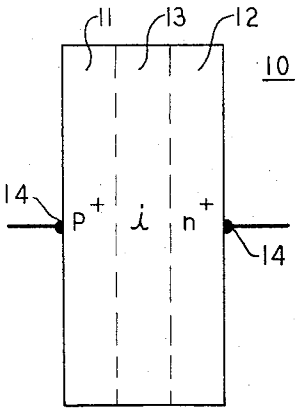
FIG. 1 is a sectional view of an exemplary junction diode, including an "intrinsic" region, designed for use in thermometric system in accordance with the invention.

The current through a junction diode depends upon the diode voltage and temperature according to the following relationship:

$$I = I_o \; [ \; \exp(eV/nkT) - 1 \; . \qquad (1)$$

In this equation $I_o$ is the reverse saturation current, $e$ is the magnitude of the electronic charge, $V$ is the voltage across the junction, $n$ is an empirical quantity usually lying in the range from 1 to 2, $k$ is Boltzmann's constant and T is the absolute temperature. Both $I_o$ and $n$ usually vary with temperature in a complicated manner which may vary from diode to diode even within the same diode type.

The diode thermometer dependence on $I_o$ is eliminated in the invention through the use of a current switching technique. In this technique the diode forward current is switched between the predetermined current levels of fixed ratio and the difference between the resulting voltages appearing across the *p-n* junction is measured. This can be seen from the following mathematical procedure.

If Equation 1 is written for two currents, $I_1$ and $I_2$ and the quotient $I_1/I_2$ is obtained, and the following relationship can be derived in the current regime in which both $I_1$ and $I_2$ are much larger than $I_o$.

$$T = enk \; \ln(I_1/I_2)] \cdot (V_1 - V_2) \; . \qquad (2)$$

Note that, except for the presence of the temperature dependent quantity $n$, the absolute temperature $T$ is a linear function of the voltage difference and the proportionality constant can be directly calculated since it is composed of physical constants ($e$ and $k$) and quantities fixed by the measurement system ($I_1$ and $I_2$). Thus, elimination of the temperature variation of the $n$ term will produce a thermometric system with a temperature scale which is calculable and linear in the observed voltage difference.

A class of semiconductor junction diodes has been found for which $n$ is nearly constant over a temperature range from cryogenic temperatures to above room temperature. The value of this constant is very nearly equal to 2 for all diodes of the class. The observed $n \approx 2$ current voltage dependence of the diodes under consideration here, is due to the fact that such diodes are constructed so as to ensure that nearly all carrier recombination takes place within the diode depletion region. The closeness of the diode behavior to the $n = 2$ ideal behavior is related to the fraction of carriers which do recombine within the depletion region. Some theoretical basis for this type of behavior can be found in A. S. Grove, *Physics and Technology of Semiconductor Devices*, John Wiley & Sons, Inc. [1967] 186–190), especially Equation 6.80.

The device parameters used by the semiconductor device designers in the design of a device to meet these requirements are the carrier diffusion length and the zero bias depletion layer width. In order to ensure the recombination of ~99 percent of the carriers within the zero bias depletion layer, its thickness must be more than approximately four times the carrier diffusion length. The use of such a device in the above described thermometric system results in a temperature scale which is linear in the observed voltage difference to within ~1% if $I_1$ and $I_2$ are at least 100 times greater than $I_0$. Typical values of $I_0$ in silicon devices are in the nanoampere range whereas they are in the picoampere range for GaAs devices. The manipulation of the material parameters, such as doping level, carrier concentration and recombination center density, in order to achieve the above results is well known in the semiconductor device art.

One type of diode which can be constructed to fall within the above class defining description is a device designed to contain a short lifetime "intrinsic" region between $p$ and $n$ regions of the diode. Diodes constructed of indirect bandgap semiconductor materials such as silicon, require the inclusion of such an "intrinsic" region in order to obtain sufficient recombination in the depletion layer region. The "intrinsic" region is a layer, often produced by epitaxial deposition, of low donor and acceptor doping levels. The resistivity of this region is typically more than $10^3$ times higher than the resistivity of the $p$ and the $n$ regions. By reducing the space charge density, this "intrinsic" region serves to broaden the space charge layer (also known as the depletion layer). In typical silicon devices with 0.01 ohm-cm resistivity $p$ and $n$ regions and a 50 ohm-cm intrinsic region the inclusion of heavy metal traps such as gold and copper dopants produces carrier diffusion lengths of ~1 $\mu$m at room temperature. In such devices, the depletion layer thickness, during the operation contemplated here, is approximately equal to the thickness of intrinsic region. Thus, diodes with a 4 $\mu$m thick intrinsic region will satisfy the class defining condition at room temperature. At lower temperatures the carrier diffusion length is smaller so that the $n = 2$ condition is more closely met. The performance of indirect bandgap semiconductor diodes with intrinsic regions containing heavy metal traps is limited at the lower end of the temperature range by a polarization phenomenon in which trapped carriers are no longer thermally ionized and build up a dipole layer in the intrinsic region blocking current flow. Typical silicon devices with 4 $\mu$m thick intrisinc regions operate down to ~50°K. However, this temperature range can be extended downward by making the intrinsic region thinner at the expense of reducing the upper end of the useful temperature scale.

Diodes made of direct bandgap semiconductor materials, such as gallium arsenide, do not necessarily require the inclusion of an intrinsic region since direct band-to-band recombination is more highly favored producing more rapid carrier recombination. Since direct band-to-band recombination does not involve trapping, such diodes do not exhibit polarization effects and are operable in the invention down to the liquid helium temperature range.

The temperature range of operability of the thermometric system depends primarily on the choice of diode. The upper end of the temperature scale is determined by the condition that $I_0$ be much less than $I_1$ and $I_2$. As explained in Grove (referred to above) $I_1$ and $I_2$ cannot be too large and still preserve the physical conditions which lead to the $n = 2$ response. This places a limitation on $I_0$, which can be estimated for any particular material by calculations indicated in Grove. $I_0$ depends on both temperature and the width of the semiconductor bandgap for the diode material. At any given temperature $I_0$ is, in the usual case, smaller for a wider bandgap material. $I_1$ and $I_2$ must also be small enough so as not to produce inordinately high heating effects in the particular thermal environment being measured.

Considering the above, the device designer will recognize that there are trade-off between linearity and maximum temperature, by operating with $I_1$ and $I_2$ closer to or further from $I_0$. Within the limitation that $I_1$ and $I_2$ are more than 100 $I_0$, a silicon diode can be operated up to 400°K. and a GaAs diode, up to 500°K. with generally a 1 percent temperature linearity. Equation 2 indicates that the thermometer sensitivity is dependent on the ratio of $I_1$ and $I_2$. A ratio of at least 2:1 is desirable. 10:1 is preferred.

FIG. 1 shows an exemplary diode constructed for use in a thermometric system. Diode 10 contains a heavily doped $p$-region 11 and a heavily doped $n$-region 12 separated by an essentially intrinsic region 13 containing a sufficiently high recombination center density to ensure the recombination of nearly all of the injected carriers within the depletion region. The bias current is supplied through electrical contacts 14. Silicon diodes of such construction have been used in the described thermometric system, resulting in a temperature scale linear to within 1% over a temperature range of 50°K. to 350°K. The diodes used had reverse recovery times less than 2 nanoseconds and reverse breakdown voltages greater than 100 volts. The reverse recovery time is a measure of the density of recombination centers and the reverse breakdown voltage is a measure of the width of the intrinsic region.

Figure 2:
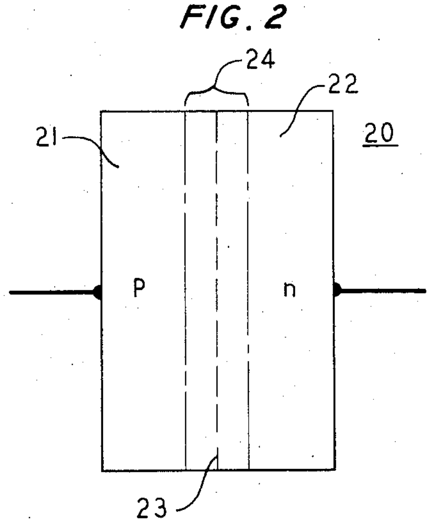
FIG. 2 is a sectional view of an exemplary junction diode constructed of an indirect bandgap semiconductor without an "intrinsic" region, designed for use in a thermometric system in accordance with the invention.

FIG. 2 shows another exemplary semiconductor diode constructed for use in a thermometric system. The diode 20 is constructed using a direct bandgap semiconductor material such as gallium arsenide. It contains a p-region 21 in contact with an n-region 22 to form a $p$-$n$ junction 23. Such a diode 20 contains a region 24 in the neighborhood of the $p$-$n$ junction 23 which is depleted of its carriers. This region is referred to as the "depletion layer" or the "space charge region." The designer and fabricator of this device has used well known principles of semiconductor technology to adjust the concentration of the various dopants in order to ensure the carrier diffusion length as being less than one quarter of the zero bias depletion layer width for preferred devices. Another class of diodes suggested for this usage are heterojunction diodes which, by their nature, possess a high density of recombination centers at the junction of the two different materials of which the devices are constituted.

Thermometric System

Figure 3:
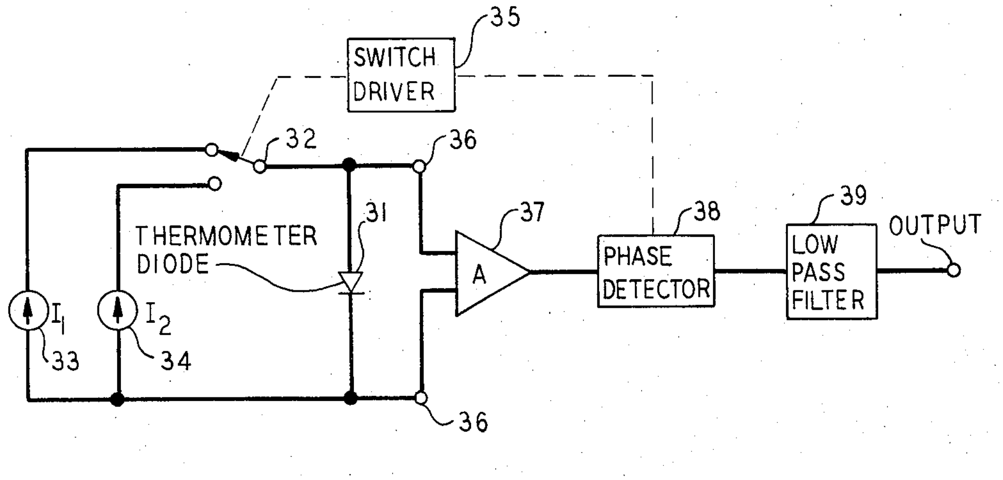
FIG. 3 is a schematic view of an exemplary thermometic system in accordance with the invention.

FIG. 3 shows, in schematic form, an exemplary thermometric system constructed in accordance with the invention. In this system, the current through the thermometer diode 31 is switched between two current levels $I_1$ and $I_2$ by means of a switching device 32 which alternately connects the diode 31 to two d-c current generators 33, 34. The switching device 32 is caused to alternate between its two states by its switch driver 35 and the voltage appearing across the thermometer diode 31 in its two states of forward current bias is observed at the voltage output connection 36. The voltage difference is measured in this exemplary device by means of an amplifier 37, a phase detector 38 and low-pass filter 39. The switch driver 35 causes the switching device 32 to alternate between its two states at a fixed frequency and this frequency is simultaneously transmitted to the phase detector. The phase detector responds to the a-c portion of the output of the amplifier 37. The magnitude of this a-c portion is proportional to the difference between the voltages appearing across the thermometer diode 31 in its two current bias states. The output of the phase detector passes through the low-pass filter 39 producing an output proportional to the absolute temperature of the thermometer diode.

Figure 4:
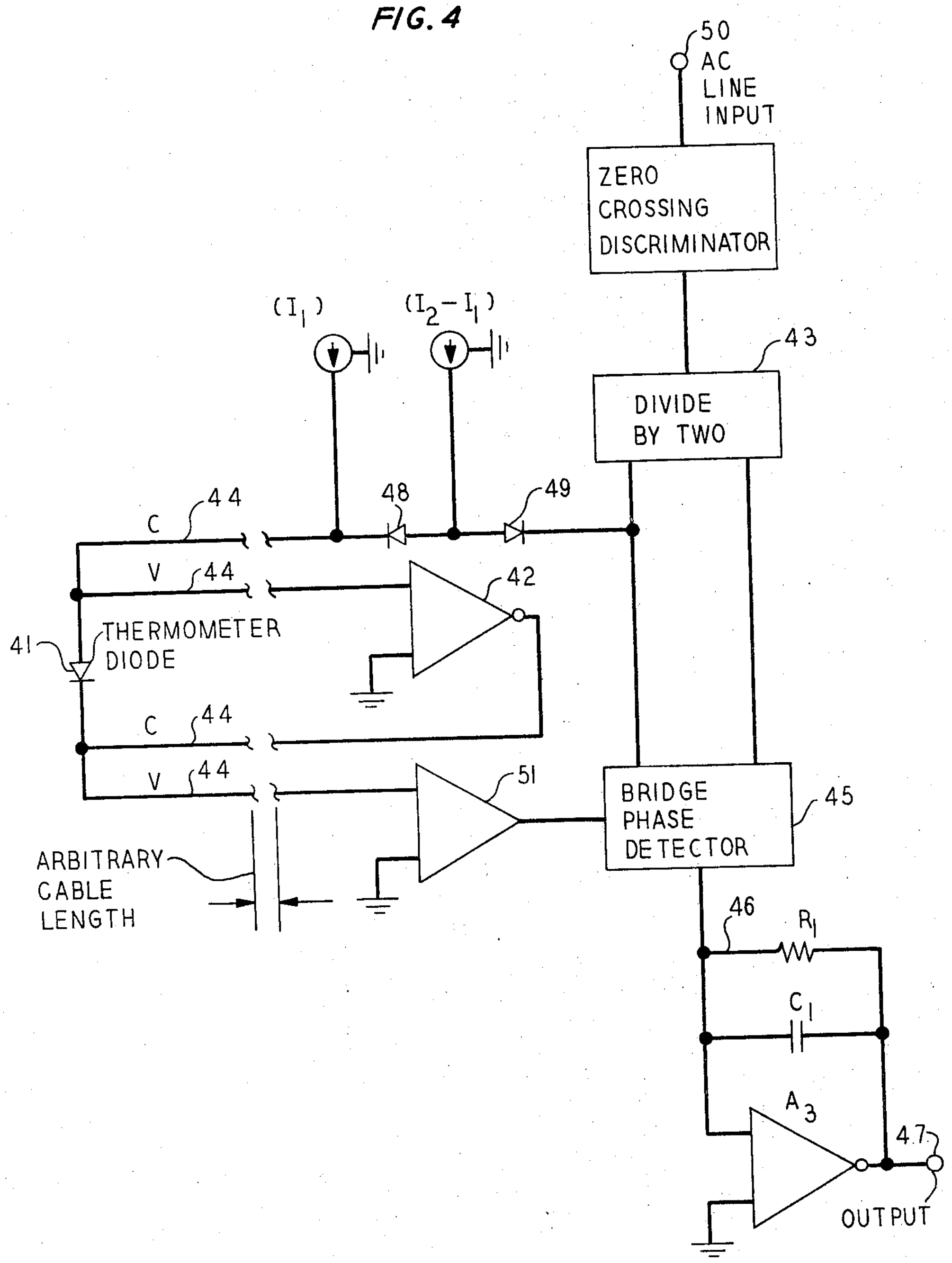
FIG. 4 is a schematic view of a second exemplary thermometric system in accordance with the invention.

FIG. 4 shows, in some detail, a particular circuit arrangement which has proven useful for temperature measurement. Here the thermometer diode 41 is connected in the feedback loop of amplifier 42 in such a way that the diode 41 is current driven alternately with current $I_1$ and $I_2$ as the state of the divide-by-two flip-flop 43 changes. A four wire current and voltage system 44 is employed to remove the effect of lead resistances.

The alternating part of the diode 41 forward voltage drop is amplified by amplifier 51, synchronously rectified in detector 45 and filtered by an active filter network 46 to provide the required temperature output 47.

In practice it is advantageous to operate systems of this kind at exactly half the a-c line frequency since then any a-c line pickup integrates to zero in each half cycle following phase detection. It is for this reason that the thermometer diode current switch 48, 49, and the phase detector 45, are operated by the divide-by-two circuit 43 which is driven by the a-c line 50.

What is claimed is:

1. An apparatus for the measurement of temperature comprising a junction diode which is electrically connected to a bias means for passing an electrical current through the diode in the forward bias direction and to a voltage measurement means for measuring the voltage drop across the diode, the bias means including a switching means for switching the electrical current between a lower current and higher current CHARACTERIZED IN THAT the greatest of the electron diffusion length and the hole diffusion length, in the region of the interface between the p-region and the n-region, is less than one quarter of the width of the zero bias depletion region.

2. An apparatus of claim 1 in which the junction diode is composed essentially of an indirect bandgap semi-conductor material with a doping profile such that there is a region of essentially intrinsic conductivity between the *n* and *p* regions.

3. An apparatus of claim 2 in which the semiconductor material is silicon.

4. An apparatus of claim 3 in which the diode has a reverse recovery time less than 2 nanoseconds and a reverse breakdown voltage greater than 100 volts.

5. Apparatus of claim 1 in which the junction diode is composed essentially of a direct bandgap semiconductor material.

6. Apparatus of claim 5 in which the semiconductor material is principally gallium arsenide.

7. Apparatus of claim 1 in which the lower current is at least 100 times as great as the diode reverse saturation current.

8. Apparatus of claim 7 in which the higher current is at least twice the lower current.

* * * * *

UNITED STATES PATENT OFFICE
CERTIFICATE OF CORRECTION

Patent No. 3,812,717 Dated May 28, 1974

Inventor(s) Gabriel L. Miller and David A. H. Robinson

It is certified that error appears in the above-identified patent and that said Letters Patent are hereby corrected as shown below:

Column 2, line 26, after "$I_o$" delete "[" and insert --{--, after "1" insert --}--.

Column 2, Equation 2, line 48, after "e" insert --/[--.

Signed and sealed this 1st day of October 1974.

(SEAL)
Attest:

McCOY M. GIBSON JR.
Attesting Officer

C. MARSHALL DANN
Commissioner of Patents